United States Patent
Ryabikin et al.

(10) Patent No.: US 11,656,881 B2
(45) Date of Patent: May 23, 2023

(54) DETECTING REPETITIVE PATTERNS OF USER INTERFACE ACTIONS

(71) Applicant: ABBYY Development Inc., Dover, DE (US)

(72) Inventors: Nikolay Ryabikin, Nizhniy Novgorod (RU); Vasily Loginov, Moscow (RU); Ruslan Garashchuk, Moscow (RU)

(73) Assignee: ABBYY Development Inc., Dover, DE (US)

( * ) Notice: Subject to any disclaimer, the term of this patent is extended or adjusted under 35 U.S.C. 154(b) by 0 days.

(21) Appl. No.: 17/512,791

(22) Filed: Oct. 28, 2021

(65) Prior Publication Data

US 2023/0131542 A1    Apr. 27, 2023

(30) Foreign Application Priority Data

Oct. 21, 2021   (RU) ............................ RU2021130755

(51) Int. Cl.
    G06F 11/34    (2006.01)
    G06F 9/451    (2018.01)
    G06F 3/0481   (2022.01)

(52) U.S. Cl.
    CPC ............ G06F 9/451 (2018.02); G06F 3/0481 (2013.01); G06F 11/3438 (2013.01)

(58) Field of Classification Search
    CPC ...................................................... G06F 9/451
    See application file for complete search history.

(56) References Cited

U.S. PATENT DOCUMENTS

| | | | |
|---|---|---|---|
| 7,098,815 B1* | 8/2006 | Samuels | H03M 7/30 707/999.102 |
| 8,010,466 B2 | 8/2011 | Patinkin | |
| 9,092,505 B1* | 7/2015 | Uszkoreit | G06F 16/287 |
| 10,565,218 B2 | 2/2020 | Yao et al. | |
| 2010/0299132 A1 | 11/2010 | Dolan et al. | |
| 2012/0082378 A1* | 4/2012 | Peters | G06F 16/58 382/165 |
| 2012/0321193 A1* | 12/2012 | Ukil | G06V 40/172 382/190 |
| 2013/0226515 A1* | 8/2013 | Pershing | G01B 21/28 702/156 |

(Continued)

FOREIGN PATENT DOCUMENTS

JP    2020514857 A    5/2020
RU    2701995 C2    10/2019

OTHER PUBLICATIONS

Moldavskaya, A.V., Intellectual information technologies, "Method of Forming Multi-Leveled Sequential Patterns", 2016, 6 pages.

(Continued)

*Primary Examiner* — Di Xiao
(74) *Attorney, Agent, or Firm* — Lowenstein Sandler LLP

(57) ABSTRACT

An example method of detecting repetitive patterns of user interface actions comprises: defining a set of overlapping shingles on a sequence of user interface events; grouping the shingles into a plurality of shingle clusters based on a chosen shingle similarity metric; selecting a shingle cluster having a maximum, among the plurality of shingle clusters, value of a chosen intra-shingle similarity metric; and identifying a repetitive user interface operation represented by the selected shingle cluster.

17 Claims, 10 Drawing Sheets

(56) References Cited

U.S. PATENT DOCUMENTS

| | | | |
|---|---|---|---|
| 2017/0178309 A1* | 6/2017 | Rakhshanfar | H04N 17/00 |
| 2018/0102938 A1 | 4/2018 | Yoon et al. | |
| 2019/0156160 A1 | 5/2019 | Slipenchuk | |
| 2019/0377818 A1* | 12/2019 | Andritsos | G06F 16/358 |
| 2020/0067942 A1* | 2/2020 | Jayaraman | H04L 63/105 |
| 2020/0125802 A1* | 4/2020 | Wigder | G06F 40/30 |
| 2020/0233865 A1 | 7/2020 | Myers et al. | |
| 2020/0244752 A1 | 7/2020 | Trainor | |
| 2020/0273221 A1 | 8/2020 | Tibshirani et al. | |
| 2021/0256434 A1* | 8/2021 | Dubey | G06N 5/043 |
| 2021/0397542 A1* | 12/2021 | Seaton | G06N 7/005 |

OTHER PUBLICATIONS

Oreshkov, Vyacheslav, "Sequential Pattern Mining Part 1", Mar. 11, 2021, 16 pages.

Kureychik, V.V., et al., Section I. Artificial intelligence and fuzzy system, "Method for Searching Sequential Patterns of User's Behavior on the Internet", Nov. 2020, 15 pages.

* cited by examiner

DETECTING REPETITIVE PATTERNS OF USER INTERFACE ACTIONS

REFERENCE TO RELATED APPLICATIONS

The present application claims the benefit of priority under 35 U.S.C. § 119 to Russian Patent Application No. 2021130755 filed Oct. 21, 2021, the disclosure of which is incorporated by reference herein.

TECHNICAL FIELD

The implementations of the disclosure relate generally to computer systems and, more specifically, to systems and methods for detecting repetitive patterns of user interface actions.

BACKGROUND

User interaction with a software application (e.g., electronic mail, accounting system, online purchasing system, online travel booking system) may involve repetitive performance of certain sequences of user interface actions (such as selecting or activating a user interface control, emitting keystrokes inputting one or more symbols, etc.).

SUMMARY OF THE DISCLOSURE

In accordance with one or more aspects of the present disclosure, an example method of detecting repetitive patterns of user interface actions comprises: defining, by a processing device, a set of overlapping shingles on a sequence of user interface events; grouping the shingles into a plurality of shingle clusters based on a chosen shingle similarity metric; selecting a shingle cluster having a maximum, among the plurality of shingle clusters, value of a chosen intra-shingle similarity metric; and identifying a repetitive user interface operation represented by the selected shingle cluster.

In accordance with one or more aspects of the present disclosure, an example system for detecting repetitive patterns of user interface actions comprises a memory and a processor coupled to the memory, the processor configured to: define, by a processing device, a set of overlapping shingles on a sequence of user interface events; group the shingles into a plurality of shingle clusters based on a chosen shingle similarity metric; select a shingle cluster having a maximum, among the plurality of shingle clusters, value of a chosen intra-shingle similarity metric; and identify a repetitive user interface operation represented by the selected shingle cluster.

In accordance with one or more aspects of the present disclosure, an example computer-readable non-transitory storage medium comprises executable instructions that, when executed by a computer system, cause the computer system to: define, by a processing device, a set of overlapping shingles on a sequence of user interface events; group the shingles into a plurality of shingle clusters based on a chosen shingle similarity metric; select a shingle cluster having a maximum, among the plurality of shingle clusters, value of a chosen intra-shingle similarity metric; and identify a repetitive user interface operation represented by the selected shingle cluster.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Described herein are systems and methods for detecting repetitive patterns of user interface actions, in order to assist the user by automating certain repeatedly performed tasks.

User interaction with a software application (e.g., electronic mail, accounting system, online purchasing system, or online travel booking system) may involve repetitive performance of certain sequences of user interface actions, such as selecting or activating a user interface control, emitting keystrokes inputting one or more symbols, etc. "User interface operation" herein refers to a sequence of user interface actions performed in furtherance of a certain task. "Instance of a user interface operation" refers to a specific sequence of user interface actions implementing the user interface operation.

Sometimes, a repetitive task may be modified. For example, when a user performs business travel bookings, the dates and destinations may change, while the rest of user interactions with the system (e.g., passenger name, address, seating preferences, payment methods) will remain essentially the same. Detecting repetitive user interface operations with high degree of accuracy may enable their effective automation. The systems and methods of the present disclosure improve the user interface efficiency by detecting, with a high degree of accuracy, repetitive patterns of user interface actions.

Figure 1:
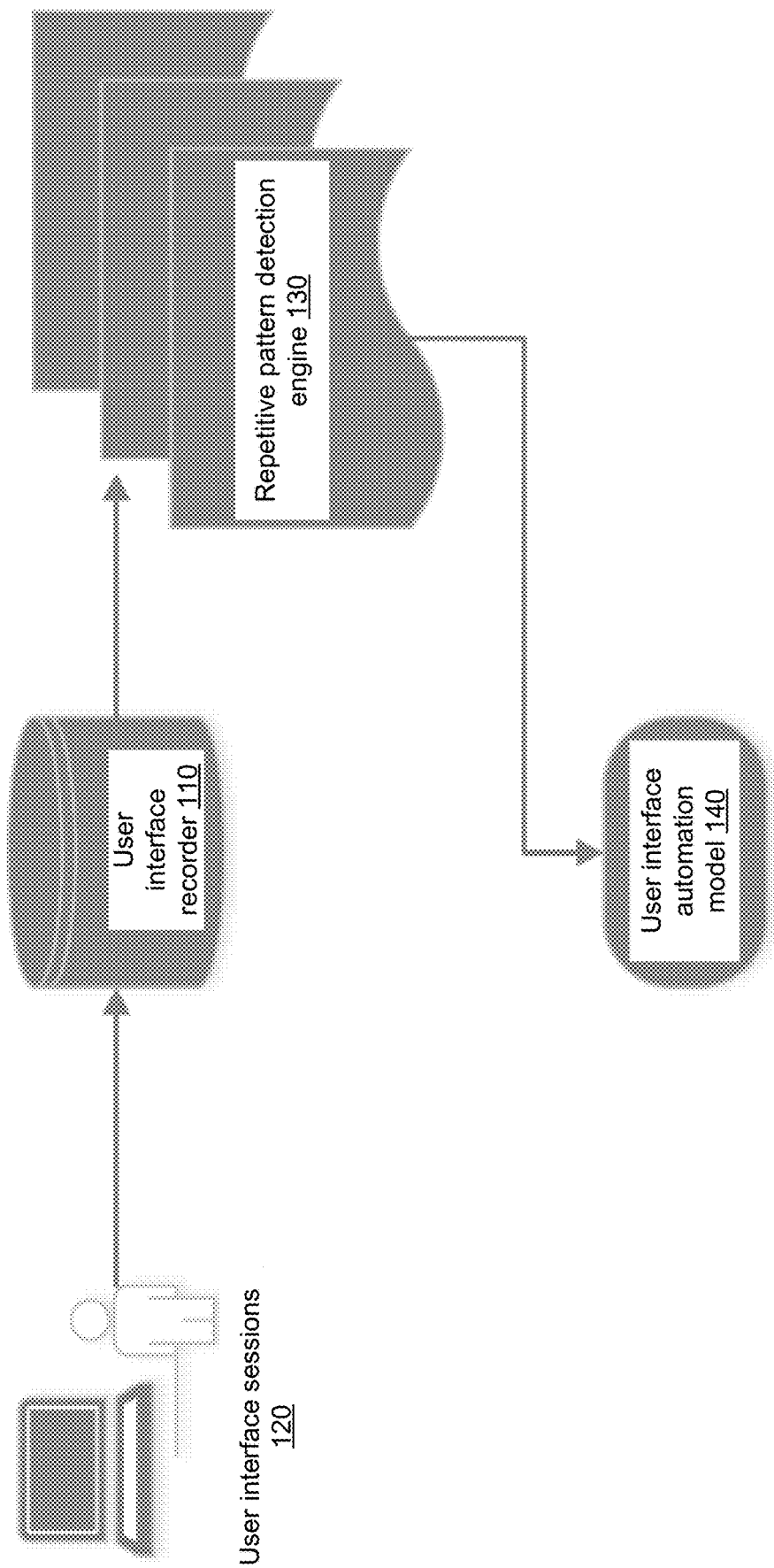
FIG. 1 schematically illustrates a high-level workflow for automating user interface based on detecting repetitive patterns of user interface actions, in accordance with aspects of the present disclosure.

The systems and methods of the present disclosure analyze recorded sequences of events and identify identical or similar sequences of user interface events corresponding to repetitive user interface operations. The identified user interface operations may be utilized, e.g., for training a model which is then used for user interface automation. In an illustrative example, a user may be presented with a list of tasks which can be automatically performed by the identified user interface operations. Upon receiving the user's selection of a task, the task may be performed automatically using a corresponding recorded sequence of a user interface events, as described in more detail herein above FIG. 1 schematically illustrates a high-level workflow for automating user interface based on detecting repetitive patterns of user interface actions, in accordance with aspects of the present disclosure. As schematically illustrated by FIG. 1, a computer system implementing the method may employ a user interface recorder component 110 to record the user interface actions. The recorded component may be implemented by a filtering driver intercepting the user interface actions.

The intercepted user interface actions may be transformed into a sequence of events, in which each event may reflect one or more user interface actions. Examples of events include opening a browser tab, opening a page specified by a uniform resource locator (URL), providing a text for an input field, etc. Each event may be characterized by a set of parameters including, e.g., the event type (e.g., mouse click, window focus, text input), the application associated with the event (i.e., the application receiving the user input), the time of the event, the type of the user interface element associated with the event (e.g., a button, a link, a text, a menu item), the relative position of the user interface element with respect to other user interface elements, coordinates of the user interface elements within the application window, text associated with the event (e.g., a sequence of characters received from the keyboard), and/or other relevant information. Each event may be encoded by a corresponding token (e.g., an integer), such that identical events would be encoded by the same token, while different events would be encoded by different tokens. Two or more events may be considered identical if they have identical values of a predetermined subset of event parameters (e.g., event type, application associated with the event, user interface element type, and the text associated with the event). Thus, a given sequence of events may be represented by an array of tokens, such that each token would encode a respective event.

User interface event recording may be performed in course of one or more user interface sessions 120 associated with one or more users. In some implementations, all recorded sessions are merged, and the remaining operations of the method are performed on the combined sequence of events. Alternatively, the recorded sessions may be grouped into two or more clusters, and each cluster of sessions may be analyzed separately. Thus, two sessions may be grouped together in a single session cluster if their session similarity metric value exceeds a predetermined session similarity threshold. In an illustrative example, the session similarity metric may be based on the similarity of histograms reflecting frequencies of occurrence of n-grams, as described in more detail herein below.

Figure 2:
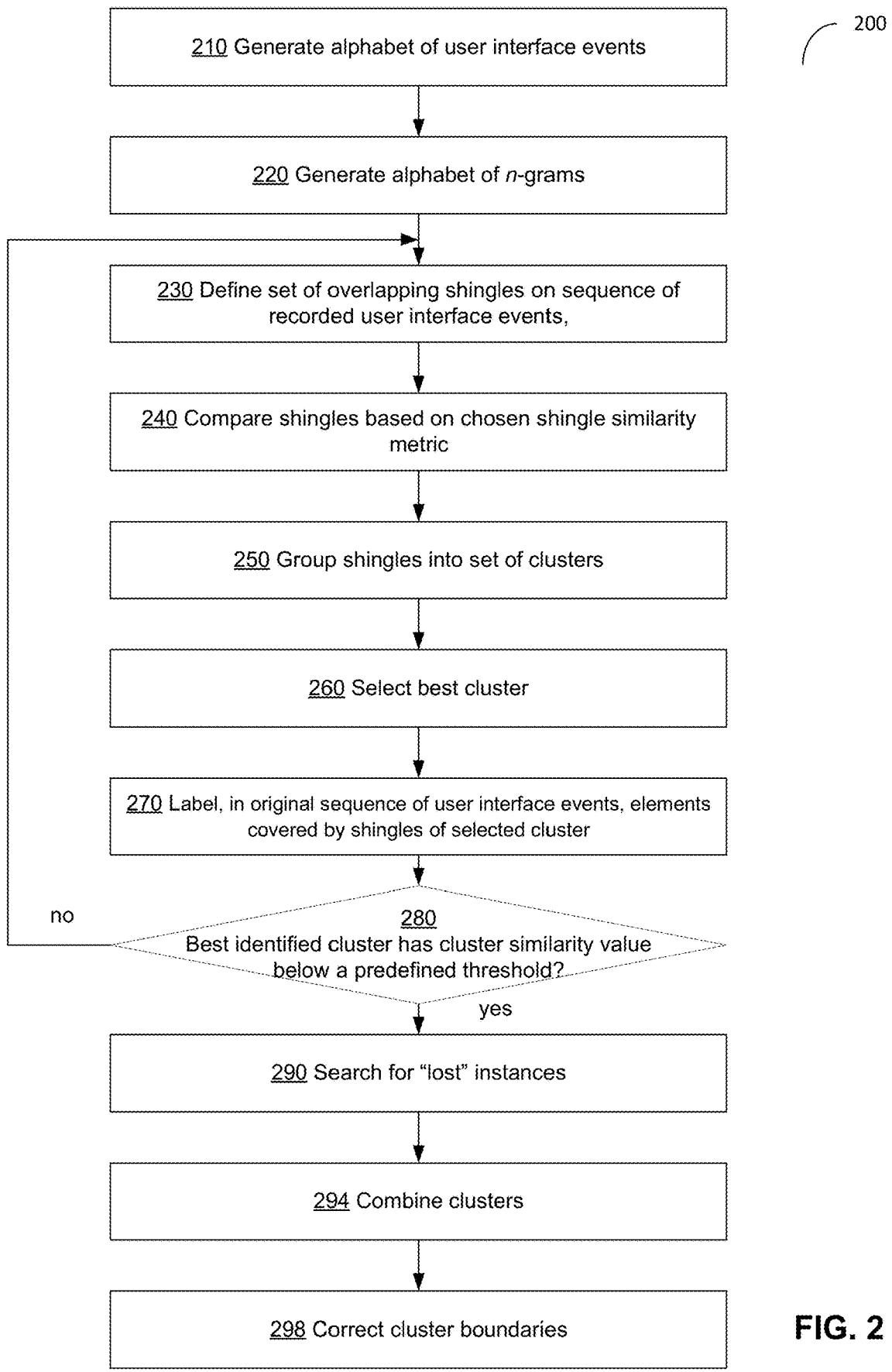
FIG. 2 is a flow diagrams illustrating the method of detecting repetitive patterns of user interface actions, in accordance with aspects of the present disclosure.

The recorded session data may be fed to the repetitive pattern detection engine 130, which may implement the pattern detection method 200 FIG. 2. The identified repetitive patterns may be utilized, e.g., for training a model 140 which is then used for user interface automation. In an illustrative example, a user may be presented with a list of tasks which can be automatically performed by the identified user interface operations. Upon receiving the user's selection of a task, the task may be performed automatically using a corresponding recorded sequence of a user interface events.

FIG. 2 is a flow diagrams illustrating an example method 200 of detecting repetitive patterns of user interface actions, in accordance with aspects of the present disclosure. The method 200 may be performed by processing logic that may comprise hardware (e.g., circuitry, dedicated logic, programmable logic, microcode, etc.), software (such as instructions run on a processing device), firmware, or a combination thereof. In one implementation, the method 200 may be performed by a processing device (e.g. a processing device 1002 of FIG. 10). In certain implementations, the method 200 may be performed by a single processing thread. Alternatively, the method 200 may be performed by two or more processing threads, each thread executing one or more individual functions, routines, subroutines, or operations of the method. In an illustrative example, the processing threads implementing the method 200 may be synchronized (e.g., using semaphores, critical sections, and/or other thread synchronization mechanisms). Alternatively, the processing threads implementing the method 200 may be executed asynchronously with respect to each other. Therefore, while FIG. 2 and the associated description list the operations of the method 200 in certain order, various implementations of the methods may perform at least some of the described operations in parallel and/or in arbitrary selected orders.

At block 210, the processing device implementing the method generates an alphabet of user interface events (i.e., an ordered list of unique user interface events) by selecting unique user interface events from one or more sequences of recorded user interface events.

At block 220, the processing device generates an alphabet of n-grams based on the alphabet of user interface events. Each n-gram is a continuous sequence of at most a predetermined number n of user interface events extracted from the alphabet of the user interface events. For n=1, the alphabet of n-grams would match the alphabet of user interface events. For an example alphabet of "12342642349," a corresponding alphabet of 2-grams would be represented by the following sequence:
{'1', '2', '3', '4', '6', '9', '12', '23', '34', '42', '26', '64', '49'}.

Figure 3:
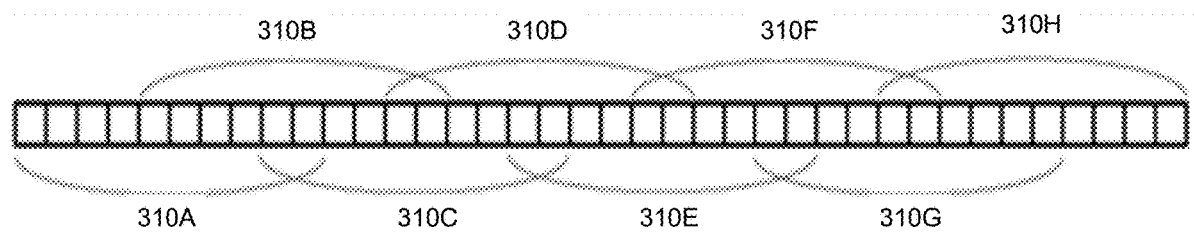
FIG. 3 schematically illustrates an example set of overlapping shingles defined on a sequence of user interface events, in accordance with aspects of the present disclosure.

At block 230, the processing device defines, on a given sequence of recorded user interface events, a set of overlapping shingles of a predetermined size with a predetermined offset with respect to each other. "Shingle" herein refers to a sequence having a pre-defined number of elements. In the illustrative example of FIG. 3, a set of overlapping shingles 310A-310H of size 10 with the offset of 4 is shown.

At block 240, the processing device compares each generated shingle with another generated shingle, based on a metric reflecting the degree of similarity of two shingles. In some implementations, the metric may be based on the frequencies of occurrence of each n-gram in the original alphabet. The following histogram reflects the frequencies of 2-grams in the above-described example alphabet of "12342642349:"
{'1': 1, '2': 3, '3': 2, '4': 3, '6': 1, '9': 1, '12': 1, '23': 2, '34': 2, '42': 2, '26': 1, '64': 1, '49': 1}

In some implementations, the shingle similarity metric may be based on Bhattacharyya distance, which reflects the similarity of two probability distributions over the same domain. Thus, the similarity metric of two shingles represented by their respective histograms $x=(x_1, x_2, \ldots, x_n)$ and $y=(y_1, y_2, \ldots, y_n)$ can be computed as follows:

$$\Delta = 1 - \sqrt{1 - \frac{\sum_{i=1}^{n} x_i y_i}{\sqrt{\sum_{i=1}^{n} x_i \sum_{i=1}^{n} y_i}}}$$

Figure 4:
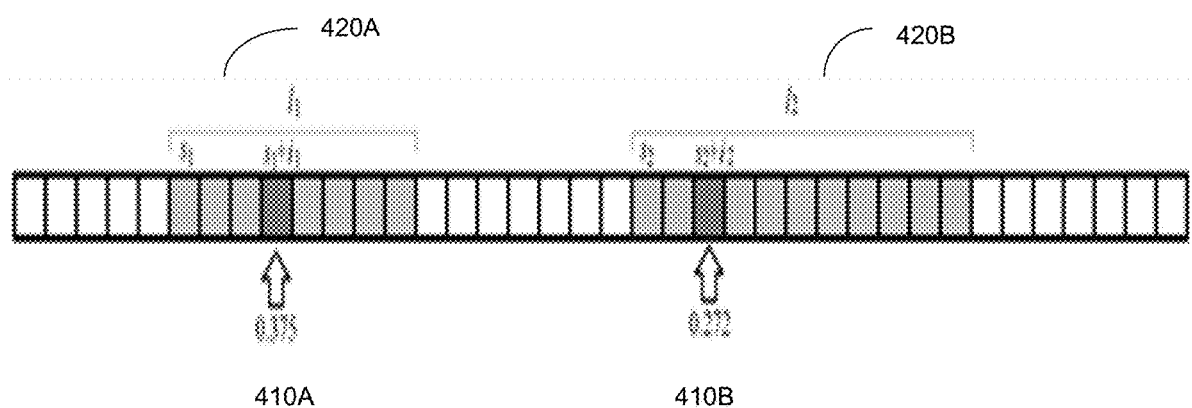
FIG. 4 schematically illustrates adjusting the shingle similarity metric by an additive term reflecting the position of each n-gram in its respective shingle, in accordance with aspects of the present disclosure.

In some implementations, the shingle similarity metric can include an additive term reflecting the position of each n-gram 410A-410B in its respective shingle 420A-420B, as schematically illustrated by FIG. 4. Accordingly, the relative position of two identical n-grams would be expressed as follows:

$$1 - \left| \frac{i_1}{L_1} - \frac{i_2}{L_2} \right|,$$

where $i_1$ is the position of the n-gram within the first shingle, $i_2$ is the position of the n-gram within the second shingle, $L_1$ is the size of the first shingle, and $L_2$ is the size of the second shingle.

At block 250, the processing device groups the shingles into two or more clusters. In an illustrative example, the clustering process starts by associating the first shingle with the first cluster. Then, for each subsequent shingle, the closest cluster is identified based on the chosen shingle similarity metric. In an illustrative example, the similarity of a given shingle and a given cluster can be determined as the average computed over all values of the similarity metric between the given shingle and each shingle of the cluster. Accordingly, the similarity values of the given shingle to each of the clusters are identified. If the maximum, among all clusters, similarity value exceeds a predetermined threshold, the shingle is associated with this cluster; otherwise, a new cluster is created and the shingle is associated with the newly created cluster.

At block 260, the processing device selects the best cluster, which is the cluster having the maximum, among all clusters, intra-cluster shingle similarity, which can be represented by the average similarity computed for all pairs of shingles belonging to the cluster.

In some implementations, if two or more clusters have the same intra-cluster shingle similarity, then the largest cluster is selected. In some implementations, in order to promote larger clusters even if they have their respective intra-cluster shingle similarity metrics below intra-cluster shingle similarity metrics of smaller clusters, a multiplicative term can be introduced into the intra-cluster shingle similarity metric. In an illustrative example, the multiplicative term can be expressed by $\tanh(\alpha^* n)$, where n is the size of the cluster.

Figure 5:
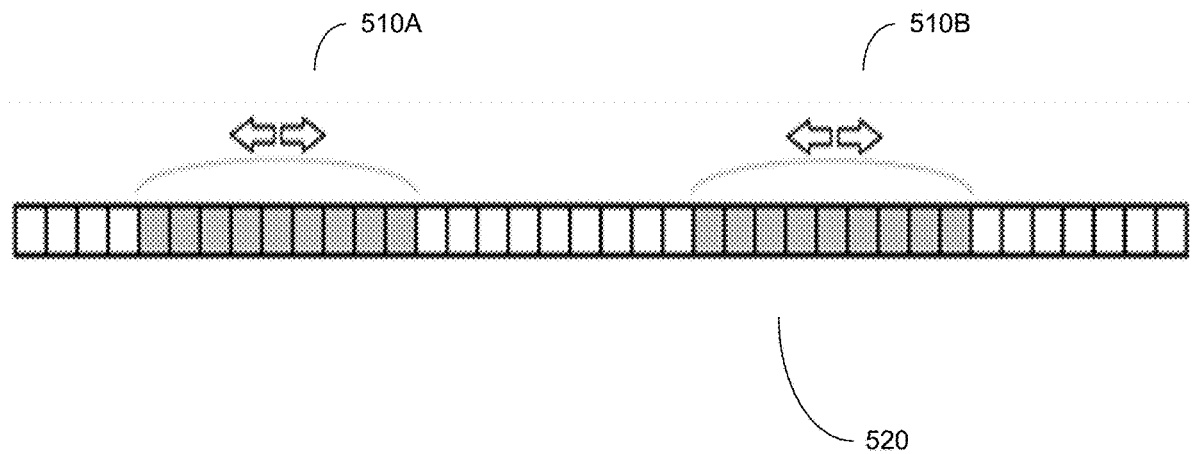
FIG. 5 schematically illustrates shifting a shingle within the shingle cluster, in accordance with aspects of the present disclosure.

In some implementations, the processing device may attempt to improve the intra-cluster shingle similarity by iteratively shifting each shingle 510A-510B within the chosen cluster 520, as schematically illustrated by FIG. 5. After each shift operation, the intra-cluster shingle similarity is re-computed. A shift operation that adversely affects the intra-cluster shingle similarity may be rolled back. Sequential shift operations may be performed until the intra-cluster shingle similarity is improved. Some shift operations may cause full overlapping of identical shingles, in which case one of the two overlapping shingles is deleted.

Figure 6:
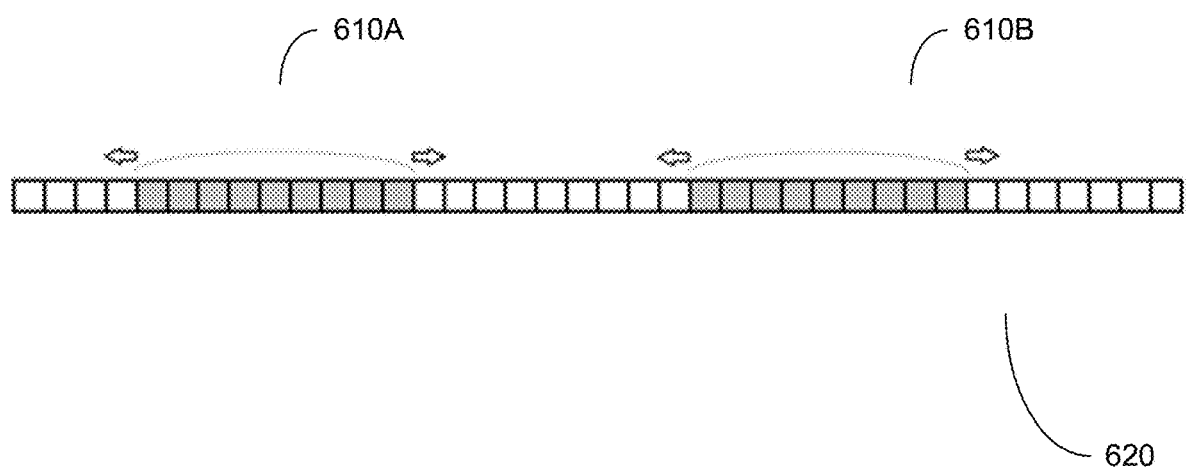
FIG. 6 schematically illustrates expanding a shingle by a predetermined number of elements, in accordance with aspects of the present disclosure.

In some implementations, the processing device may attempt to improve the intra-cluster shingle similarity by iteratively expanding every shingle 610A-610B of the chosen cluster 620 by a predetermined number of elements, as schematically illustrated by FIG. 6. Sequential expansion operations may be performed until the intra-cluster shingle similarity is improved. Some expansion operations may cause full overlapping of identical shingles, in which case one of the two overlapping shingles is deleted.

Figure 7:
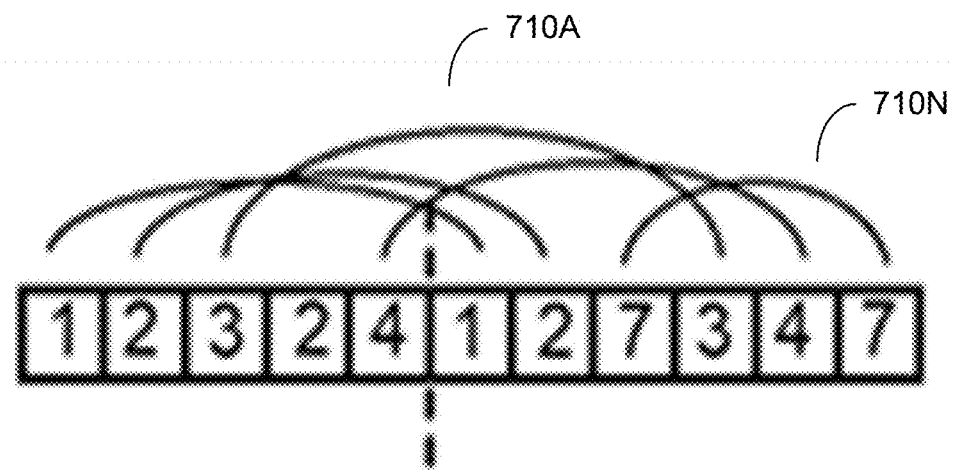
FIG. 7 schematically illustrates an example histogram of arcs connecting respective pairs of occurrences of user interface events within a sequence of user interface events, in accordance with aspects of the present disclosure.

The boundary expansion operation may sometimes lead to a shingle growing excessively, which may result in inadvertently combining several consecutive operations into a single operation. In order to avoid such an undesired effect, instances having their respective sizes exceeding a predetermined high threshold (e.g., 20-30 user interface events) may, in some implementations, be split into two operations by the following procedure: for each user interface event of a given large instance, the indices of its first and last occurrence in the instance are recorded. For each user interface event from an instance, the index of its first and last occurrences in the instance is recorded. Then, a histogram of arcs 710A-710N connecting the respective pairs of occurrences is built, as schematically illustrated by FIG. 7. Next, the position of the element that is coveted by the maximum number of arcs is identified. If the maximum number of arcs exceeds a predetermined threshold number of arcs, the instance is split after the identified element that is coveted by the maximum number of arcs. This procedure may be recursively performed for the newly formed instances. Otherwise, if the maximum number of arcs fails below the predetermined threshold number of arcs, no instance splitting is performed.

The resulting cluster produced at block 260 represents a repetitive user interface operation, while the shingles of the resulting cluster represent instances of the identified repetitive user interface operation.

Figure 8:
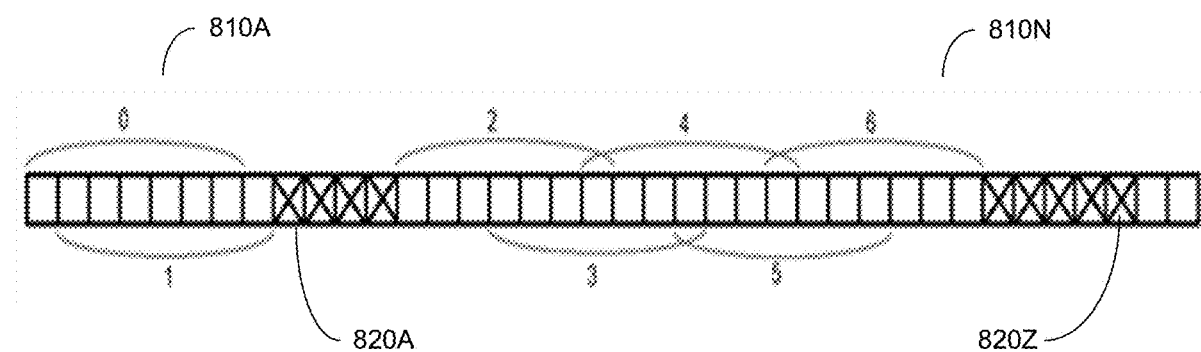
FIG. 8 schematically illustrates labeling, within an example sequence of a user interface events, the elements covered by shingles reflecting the instances of the user interface operation identified by selected clusters, in accordance with aspects of the present disclosure.

At block 270, the processing device labels, in the original sequence of user interface events, the elements covered by shingles of the chosen cluster reflecting the instances of the user interface operation identified at block 260, and the method loops back to block 230, where a new set of shingles is generated, such that the newly generated shingles would nor overlap with the labeled elements of the sequence, as schematically illustrated by FIG. 8. The operations of block 230-270 are repetitive iteratively until the best identified cluster has the intra-cluster similarity value falling below a predetermined low threshold (block 280).

In some implementations, the processing device may further perform optional functions that are described herein below with reference to blocks 290-298.

At block 290, the processing device optionally performs a search for possible "lost" (i.e., unaccounted for) user interface operation instances. The processing device generates, for each cluster, a set of shingles covering the unlabeled elements of the sequence of user interface events. The size of shingles is chosen to match the average size of the instances of the cluster. Then, the above-described shifting and expansion operations are performed with respect to each shingle of the newly generated shingles. If the resulting intra-cluster similarity exceeds a predetermined high threshold, the newly generated shingle is appended to the cluster.

Figure 9:
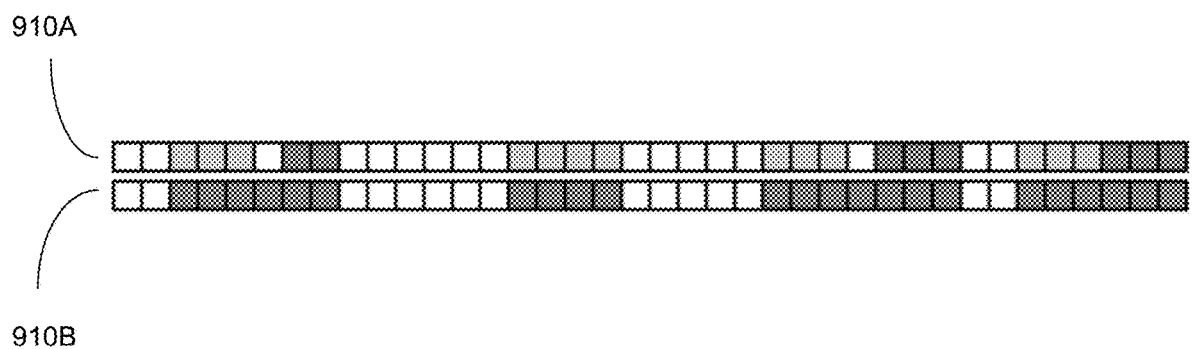
FIG. 9 schematically illustrates combining two shingle clusters into a single cluster, in accordance with aspects of the present disclosure.

At block 294, the processing device optionally attempts to identify pairs of clusters that can be combined. Responsive to determining that a predetermined shingle combination criterion is satisfied with respect to a pair of shingle clusters, such clusters can be combined. In an illustrative example, the shingle combination criterion ascertains whether instances of the j-th cluster always (or at least in a predetermined number of cases) follow instances of the i-th cluster. If this condition is satisfied, the i-th cluster and the j-th cluster are combined into a single cluster, as schematically illustrated by FIG. 9.

At block 298, the processing device optionally attempts to correct the cluster boundaries. Responsive to determining that a predetermined boundary shift criterion is satisfied with respect to one of the boundaries of a given shingle cluster and a specified element of the sequence of user interface events, the boundary can be shifted to the specified element of the sequence of user interface events. In an illustrative example, for a given cluster, respective frequency of occurrence are computed for each of the elements located within a predetermined number of elements of the starting element of the cluster. Then, a predetermined number of most frequent elements is selected. For each instance, its starting element is shifted to one of the selected most frequent elements, if such an element is found in the vicinity of the starting element. Similar operations may be performed for the final element of each clusters.

The resulting clusters produced by the method represent respective user interface operations, while the shingles of these clusters represent instances of the identified repetitive user interface operations.

The identified user interface operations and their respective instances may be utilized, e.g., for training a model which is then used for user interface automation. In an illustrative example, a user may be presented with a list of tasks which can be automatically performed by the identified user interface operations. Upon receiving the user's selection of a task, the task may be performed automatically using a corresponding recorded sequence of a user interface events.

Figure 10:
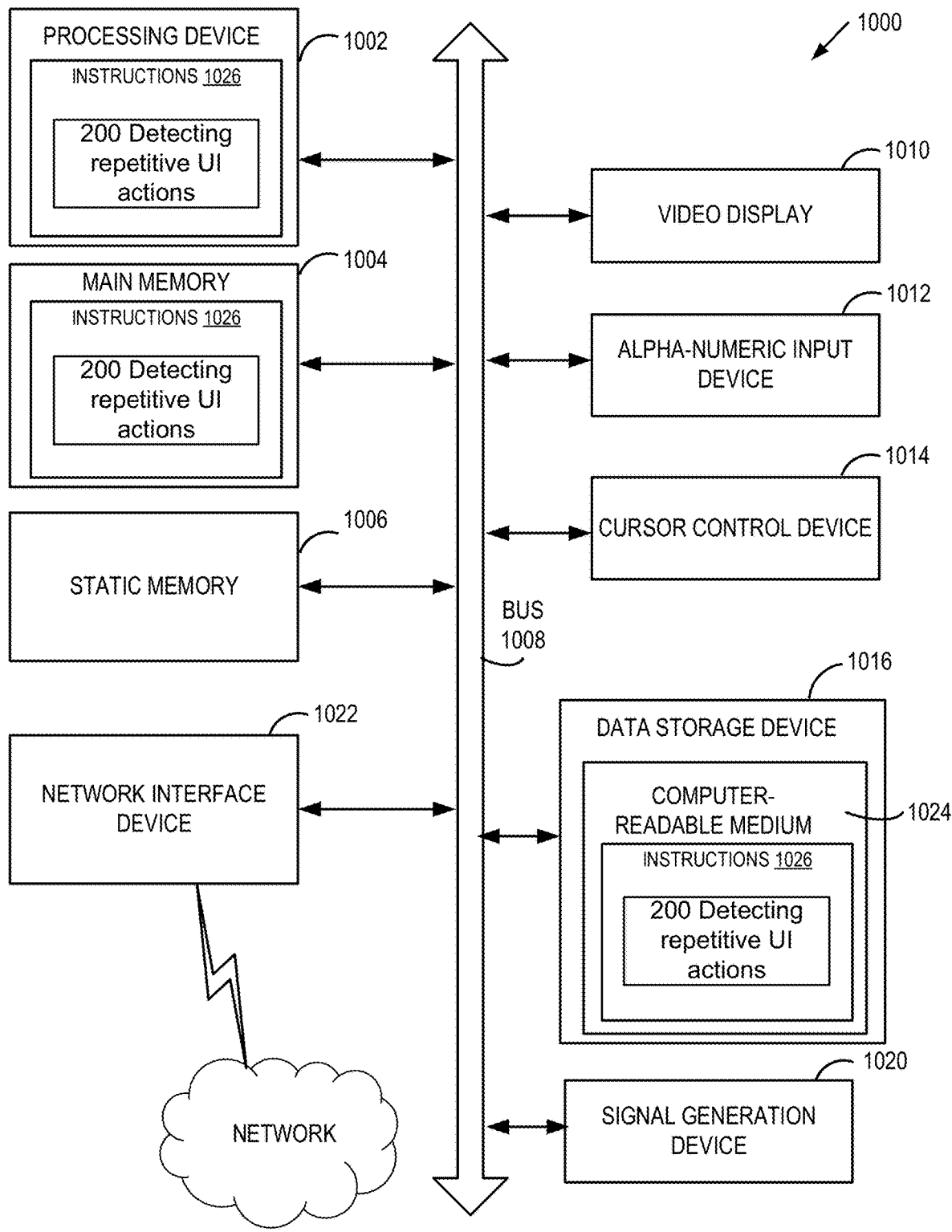
FIG. 10 illustrates a block diagram of a computer system in accordance with some implementations of the present disclosure.

FIG. 10 depicts an example computer system 1000 which can perform the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1000 includes a processing device 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for implementing the classification engine 111 and/or the training engine 161 of FIG. 1 and to perform the operations and steps discussed herein (e.g., method 200 of detecting repetitive patterns of user interface actions).

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker). In one illustrative example, the video display unit 1010, the alphanumeric input device 1012, and the cursor control device 1014 may be combined into a single component or device (e.g., an LCD touch screen).

The data storage device 1016 may include a computer-readable medium 1024 on which is stored the instructions 1026 embodying any one or more of the methods or functions described herein. The instructions 1026 may also reside, completely or at least partially, within the main memory 1004 and/or within the processing device 1002 during execution thereof by the computer system 1000, the main memory 1004 and the processing device 1002 also constituting computer-readable media. In some implementations, the instructions 1026 may further be transmitted or received over a network via the network interface device 1022.

While the computer-readable storage medium 1024 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    defining, by a processing device, a set of overlapping shingles on a sequence of user interface events;
    grouping the shingles into a plurality of shingle clusters based on a chosen shingle similarity metric;
    selecting a shingle cluster having a maximum, among the plurality of shingle clusters, value of a chosen intra-cluster shingle similarity metric;
    labeling, in the sequence of user interface events, elements covered by shingles of the selected shingle cluster;
    defining, on a sequence of user interface events, a second set of overlapping shingles of a predetermined shingle size;
    responsive to determining that a value of the chosen shingle similarity metric of a shingle of the second set of overlapping shingles with respect to the selected shingle cluster exceeds a predefined threshold, appending the shingle to the selected shingle cluster; and
    identifying a repetitive user interface operation represented by the selected shingle cluster.

2. The method of claim 1, further comprising:
    utilizing the repetitive user interface operation represented by the selected shingle cluster for training a model facilitating user interface automation.

3. The method of claim 1, further comprising:
labeling, in the sequence of user interface events, elements covered by shingles of the selected shingle cluster;
iteratively repeating the grouping, selecting, and identifying operations on unlabeled elements of the sequence of user interface events.

4. The method of claim 1, further comprising:
responsive to determining that a cluster combination criterion is satisfied with respect to the selected shingle cluster and a second shingle cluster, combining the selected shingle cluster and the second shingle cluster.

5. The method of claim 1, further comprising:
responsive to determining that a boundary shift criterion is satisfied with respect to a boundary of the selected shingle cluster and a specified element of the sequence of user interface events, shifting the boundary to the specified element of the sequence of user interface events.

6. The method of claim 1, wherein the chosen shingle similarity metric is based on similarity of histograms reflecting frequencies of occurrence of n-grams within a first shingle and a second shingle.

7. A system comprising:
a memory; and
a processing device operatively coupled to the memory, the processing device configured to:
define a set of overlapping shingles on a sequence of user interface events;
group the shingles into a plurality of shingle clusters based on a chosen shingle similarity metric;
select a shingle cluster having a maximum, among the plurality of shingle clusters, value of a chosen intra-cluster shingle similarity metric;
label, in the sequence of user interface events, elements covered by shingles of the selected shingle cluster;
define, on a sequence of user interface events, a second set of overlapping shingles of a predetermined shingle size;
responsive to determining that a value of the chosen shingle similarity metric of a shingle of the second set of overlapping shingles with respect to the selected shingle cluster exceeds a predefined threshold, append the shingle to the selected shingle cluster; and
identify a repetitive user interface operation represented by the selected shingle cluster.

8. The system of claim 7, wherein the processing device is further configured to:
utilize the repetitive user interface operation represented by the selected shingle cluster for training a model facilitating user interface automation.

9. The system of claim 7, wherein the processing device is further configured to:
label, in the sequence of user interface events, elements covered by shingles of the selected shingle cluster;
iteratively repeat the grouping, selecting, and identifying operations on unlabeled elements of the sequence of user interface events.

10. The system of claim 7, wherein the processing device is further configured to:
responsive to determining that a cluster combination criterion is satisfied with respect to the selected shingle cluster and a second shingle cluster, combine the selected shingle cluster and the second shingle cluster.

11. The system of claim 7, wherein the processing device is further configured to:
responsive to determining that a boundary shift criterion is satisfied with respect to a boundary of the selected shingle cluster and a specified element of the sequence of user interface events, shift the boundary to the specified element of the sequence of user interface events.

12. The system of claim 7, wherein the chosen shingle similarity metric is based on similarity of histograms reflecting frequencies of occurrence of n-grams within a first shingle and a second shingle.

13. A non-transitory computer-readable storage medium including executable instructions that, when executed by a computing system, cause the computing system to:
define, by a processing device, a set of overlapping shingles on a sequence of user interface events;
group the shingles into a plurality of shingle clusters based on a chosen shingle similarity metric;
select a shingle cluster having a maximum, among the plurality of shingle clusters, value of a chosen intra-cluster shingle similarity metric;
label, in the sequence of user interface events, elements covered by shingles of the selected shingle cluster;
define, on a sequence of user interface events, a second set of overlapping shingles of a predetermined shingle size;
responsive to determining that a value of the chosen shingle similarity metric of a shingle of the second set of overlapping shingles with respect to the selected shingle cluster exceeds a predefined threshold, append the shingle to the selected shingle cluster; and
identify a repetitive user interface operation represented by the selected shingle cluster.

14. The non-transitory computer-readable storage medium of claim 13, further comprising executable instructions that, when executed by the computing system, cause the computing system to:
utilize the repetitive user interface operation represented by the selected shingle cluster for training a model facilitating user interface automation.

15. The non-transitory computer-readable storage medium of claim 13, further comprising executable instructions that, when executed by the computing system, cause the computing system to:
label, in the sequence of user interface events, elements covered by shingles of the selected shingle cluster;
iteratively repeat the grouping, selecting, and identifying operations on unlabeled elements of the sequence of user interface events.

16. The non-transitory computer-readable storage medium of claim 13, further comprising executable instructions that, when executed by the computing system, cause the computing system to:
responsive to determining that a cluster combination criterion is satisfied with respect to the selected shingle cluster and a second shingle cluster, combine the selected shingle cluster and the second shingle cluster.

17. The non-transitory computer-readable storage medium of claim 13, wherein the chosen shingle similarity metric is based on similarity of histograms reflecting frequencies of occurrence of n-grams within a first shingle and a second shingle.

* * * * *